July 9, 1935.  W. L. KAUFFMAN, 2D  2,007,448
WRINGER
Filed May 11, 1933
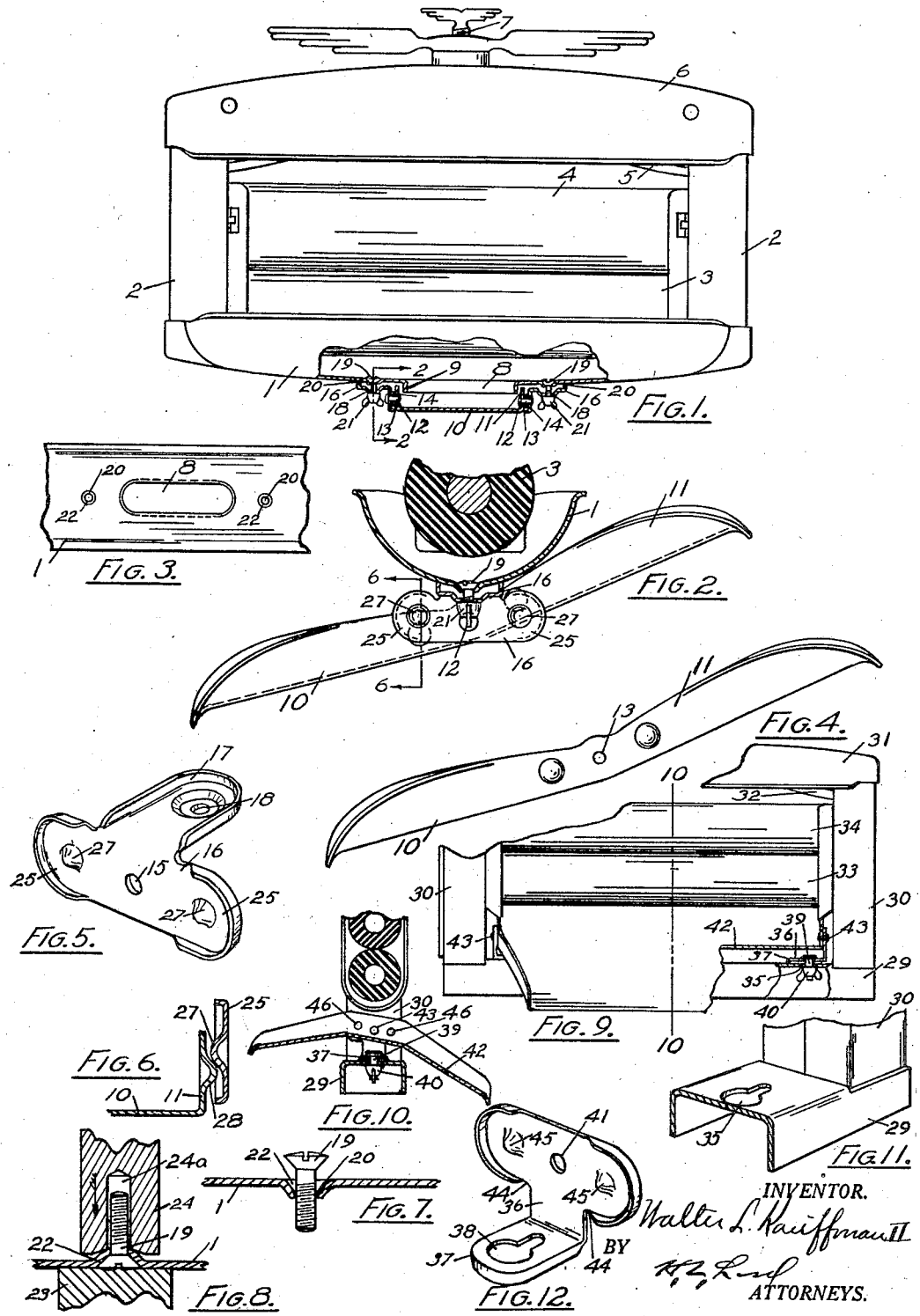
INVENTOR.
Walter L. Kauffman II
BY
ATTORNEYS.

Patented July 9, 1935

2,007,448

UNITED STATES PATENT OFFICE 2,007,448

WRINGER

Walter L. Kauffman, 2d, Erie, Pa., assignor to Lovell Manufacturing Company, Erie, Pa., a corporation of Pennsylvania Application May 11, 1933, Serial No. 670,463

9 Claims. (Cl. 68—32)

Wringers are usually provided with a drain member. This drain member may be in the form of a spout, or board below a trough collecting the water from the rolls, or it may be in the nature of a drip board below the rolls. It is desirable to provide such tilting member with a yielding means for locking it in adjustment so that it may be readily swung to the proper position and will remain in the position to which it is adjusted. The present invention is designed to provide a simple mechanism for accomplishing this purpose. Features and details of the invention will appear from the specification and claims.

A preferred embodiment of the invention is illustrated in the accompanying drawing as follows:—

Fig. 1 shows a front elevation of a wringer, partly in section, said wringer having a drip trough under the rolls.

Fig. 2 a section on the line 2—2 in Fig. 1.

Fig. 3 a plan view of the central portion of the drip trough.

Fig. 4 a side elevation of the tilting spout detached.

Fig. 5 a perspective view of the bracket for supporting the spout.

Fig. 6 a section on the line 6—6 in Fig. 2.

Figs. 7 and 8 views showing the method of assembling the attaching screws for the brackets.

Fig. 9 a front elevation of a modification having a drip board, a part being broken away to better show construction.

Fig. 10 a section on the line 10—10 in Fig. 9.

Fig. 11 a perspective view of a portion of the base of the wringer.

Fig. 12 a perspective view of the bracket used in the structure of Fig. 9.

In Figs. 1 to 6, 1 marks the base of the wringer, 2 the side stiles, 3 and 4 the rolls, 5 a pressure spring, 6 the top bar, and 7 the pressure adjusting screw. These are of common construction except that the base 1 is of trough shape and thus forms not only the base, but a drip collector.

The trough has a drain opening 8 surrounded by a flange 9.

A spout 10 is provided with side flanges 11. Pivot pins 12 extend through openings 13 in the flanges 11 of the spout through a washer 14 and through openings 15 in a bracket 16. There is a bracket at each side of the spout and each bracket is provided with a base portion 17, this being flanged to stiffen the base and this has a perforation 18 and a screw 19 extends through an opening in the bottom of the base 1 and through the perforation 18 and a nut 21 arranged at the bottom of the bracket secures the bracket in place.

The opening 20 is counter-sunk at 22 in the stamping and the screw is definitely secured in the opening and the opening closed so as to be watertight by placing the screw in a press with a base 23 and plunger 24, the plunger 24 having an opening 24a adapted to receive the screw and permit the engagement of the plunger with the edge of the flanged opening 22. Under the press pressure the edges of this flanged opening are definitely closed around the screw so as to retain the screw in place and make the same water-tight.

The supporting portion of the bracket 16 has ears 25 extending from it. These ears are flanged around their outer periphery so as to stiffen them, but these flanges are removed in the connection with the main portion of the bracket so as to provide a yielding portion and thus the ears are resiliently yielding. Each ear has a projection 27 struck up in it which is adapted to engage similar projections 28 in the flanges 11 of the spout.

When the spout is assembled with the brackets the projections form engaging surfaces overlapping transversely the path of movement so that as the spout is tilted the projections operating against each other spring the ears outwardly permitting the projections to pass and then the projections of the spout are brought between the projections 27 on the flange of the ears. Thus the spout is yieldably locked in each tilted position.

A somewhat similar structure is used in the modification shown in Fig. 4 and following. Here the wringer frame 29 has stiles 30, a top bar 31, pressure spring 32, rolls 33 and 34 of the usual wringer construction. The base has a key-hole slot 35 and a bracket 36 has a flanged base 37 with a key-hole slot 38. The bracket is secured in place on the base of the wringer by a screw 39 which is inserted through the key-hole slot and secured by a nut 40. It will be understood that there is a bracket at each end of the wringer. The bracket has a supporting portion which has a perforation 41 and a drip board 42 is pivotally connected by a pivot pin 43 extending through the flange of the drip board and the opening 41. The supporting portion has lateral ears which are flanged, the flange being omitted at 44 to render the ears resiliently yieldable. These ears have projections 45 which engage projections 46 in the same manner that the projections 27 engage the projections 28. Thus the drip board can be swung, or tilted in either direction and is yieldingly locked in its adjusted position, the manner of operation being substantially similar to that of adjusting the spout.

What I claim as new is:—

1. In a wringer, the combination of a frame; a tilting drain member; and brackets on which the member is pivoted, said member and brackets having opposing walls one of which is yielding with engaging surfaces overlapping transversely to the path of movement and yieldingly locking the the tilting member against tilting action.

2. In a wringer, the combination of a frame; a tilting drain member; and brackets on which the member is pivoted, said drain member having vertical side walls and said bracket having walls opposing said side walls one of which is yielding with engaging surfaces overlapping transversely to the path of movement and yieldingly locking the tilting member against tilting action.

3. In a wringer, the combination of a frame; a tilting drain member; brackets on which the member is pivoted, said brackets having base portions adapted to be secured to the frame and vertically extending supporting portions; and pivotal connections between the supporting portions and the member, said supporting portions and the member having opposing walls one of which is yielding with engaging surfaces overlapping transversely to the path of movement and yieldingly locking the tilting member against tilting action.

4. In a wringer, the combination of a frame; a tilting member; and brackets on which the member is pivoted, said brackets having yielding ears extending therefrom opposing a wall of the member, said member and ears having yielding engaging surfaces overlapping transversely to the path of movement and yieldingly locking the tilting member.

5. In a wringer, the combination of a frame; a tilting member; and brackets on which the member is pivoted, said brackets having flanged ears extending therefrom with yielding connections to the supporting portions, said member and ears having engaging surfaces overlapping transversely to the path of movement and yieldingly locking the tilting member against tilting action.

6. In a wringer, the combination of a frame; a tilting drain member; brackets on which the member is pivoted; and a supporting portion projecting from the base with laterally extending yielding ears projecting from opposing sides of the supporting portion, said ears and member having opposing walls with yielding engaging surfaces overlapping transversely to the path of movement and yieldingly locking the tilting member.

7. In a wringer, the combination of a frame; a tilting drain member; brackets on which the member is pivoted, said brackets having flanged bases secured to the frame; and supporting portions with ears extending from opposite sides of each supporting portion, said ears being flanged with a non-flanged part connecting the ears with the supporting portions, said ears and member having opposing walls with yielding engaging surfaces overlapping transversely to the path of movement and yieldingly locking the tilting member.

8. In a wringer, the combination of a frame having a base forming a drip trough, said drip trough having a drain opening and counter-sunk screw-receiving openings struck up in the trough portion; screws in said screw-receiving openings, the flanges of the screw-receiving openings being closed upon the shank of the screw; brackets having bracket bases secured by said screws, said brackets having supporting portions extending from the bracket bases; and a tilting spout pivotally mounted on the supporting portions of the brackets, said trough and supporting portions having opposing walls with yielding engaging surfaces overlapping transversely to the path of movement and yieldingly locking the trough.

9. In a wringer, the combination of a frame having a base and side stiles, the base having key-hole slots therein; a tilting drain board mounted over the base; brackets having bases with key-hole slots registering with the key-hole slots in the base and upwardly extending supporting portions, said supporting portions and the drain board having opposing walls with yielding engaging surfaces overlapping transversely to the path of movement and yieldingly locking the drain board.

WALTER L. KAUFFMAN, II.